(No Model.)

J. T. GORMLY.
SPOKE SOCKET.

No. 340,571.  Patented Apr. 27, 1886.

Witnesses
Edward R. Cary
Robert W. Gormly

Inventor
John T. Gormly

UNITED STATES PATENT OFFICE.

JOHN T. GORMLY, OF TROY, NEW YORK.

SPOKE-SOCKET.

SPECIFICATION forming part of Letters Patent No. 340,571, dated April 27, 1886.

Application filed December 28, 1885. Serial No. 186,841. (No model.)

*To all whom it may concern:*

Be it known that I, JOHN T. GORMLY, a citizen of the United States, residing at Troy, in the county of Rensselaer and State of New York, have invented a new and useful Felly and Spoke Protector, of which the following is a specification.

The objects of my improvement are to provide a shield or protector to the spoke and felly of a carriage-wheel at their points of contact and over surfaces of the same that are liable to meet with injury in use, and to render the surfaces exposed more durable, and as a result the wheel more capable of continued use, as at first adjusted. I attain these objects by my improved attachment illustrated in the accomyanying drawings, in which—

Figure 1:
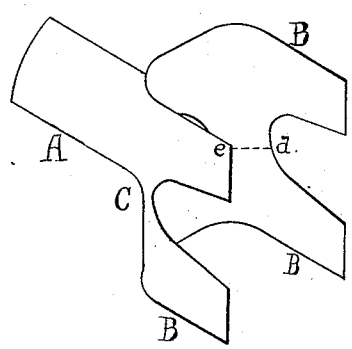
Figure 2:
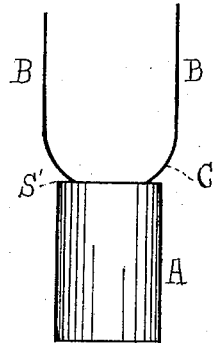
Figure 3:
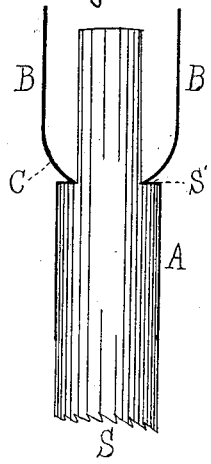
Figure 4:
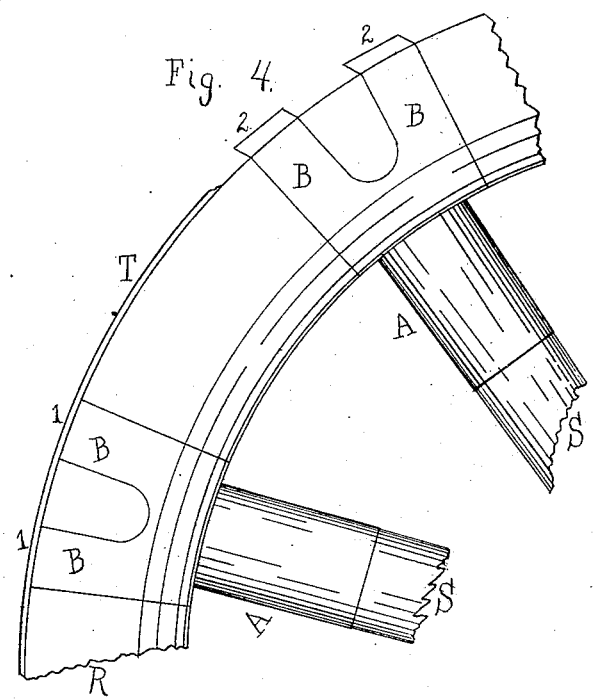

Figure 1 is an isometrical projection or plan of the entire improvement. Fig. 2 is a vertical section of the same on the line $d\ e$, Fig. 1. Fig. 3 is a similar view to the last, showing the spoke of the wheel in position. Fig. 4 is a segment of the rim of the wheel and spokes, showing my improvement in position.

Similar letters refer to similar parts throughout the several views.

On the wheels as ordinarily constructed, and before placing the rim R in position, I place upon and over the outer or smaller ends of the spokes S the sleeve A, thrusting it down, so that the shoulder S' rests against the cap C, whose diameter at its junction with the sleeve is smaller than the diameter of the sleeve. I also construct, in continuation of the sleeve A, the cap C with flanges B, which latter appendages, when the rim R of the wheel is placed in position, presses upon each side of the rim, and extending up to the tire T, as seen in Fig. 4 at points 1 1, while at points 2 2 the tire is omitted to show that the ends of the flanges may be battened down under the tire of the wheel.

The sleeve A is made of such length as may be desired to cover the exposed portions of the spoke, and the sleeve, cap, and flanges are made in one entire piece, and thus are caused to closely hug the spoke and the under and side portions of the rim, as shown.

My improved felly and spoke protector is made of malleable iron or wrought metal for heavy wheels, while for lighter wheels it may be of steel, or made of sheet metal, and the flanges may be of such form as desired to accomplish the purpose above set forth, so that when my improved device is in position, as seen in Fig. 4, it will be held securely without rivets or other fastenings, and safely hold and protect the spoke and felly in their respective positions as at first adjusted, and prevent their displacement, as occurs in wheels as ordinarily constructed, while the sleeve, cap, and flange or flanges mutually aid, support, and protect the adjacent parts of the wheel at their junction, where in operation they are usually liable, if not so sustained and protected, to become displaced or become loosened.

What I claim is—

In a wheel for vehicles, and in combination with the felly and spoke in one entire device, the following metallic parts: the sleeve A and cap C with double flanges B B, whose ends are battened under and held by the tire, substantially as described, and for the purpose set forth.

JOHN T. GORMLY.

Witnesses:
DION GAMBELL,
COLE H. DENIO.